US00RE44519E

(19) United States
(12) Reissued Patent
Anderson et al.

(10) Patent Number: US RE44,519 E
(45) Date of Reissued Patent: Oct. 8, 2013

(54) STARCH COMPOSITIONS AND METHODS FOR USE IN PAPERMAKING

(75) Inventors: Kevin Ray Anderson, Cedar Rapids, IA (US); David Edward Garlie, Eau Claire, WI (US)

(73) Assignee: Cargill, Incorporated, Wayzata, MN (US)

(21) Appl. No.: 11/065,721

(22) Filed: Feb. 24, 2005

Related U.S. Patent Documents

Reissue of:
(64) Patent No.: 6,524,440
Issued: Feb. 25, 2003
Appl. No.: 09/740,278
Filed: Dec. 19, 2000

U.S. Applications:
(63) Continuation-in-part of application No. 09/635,962, filed on Aug. 10, 2000, now Pat. No. 6,451,170.

(51) Int. Cl.
*D21H 21/10* (2006.01)
*D21H 23/02* (2006.01)
*C08B 31/00* (2006.01)
*C08B 33/00* (2006.01)
*C08B 35/00* (2006.01)

(52) U.S. Cl.
USPC ..... 162/175; 162/181.6; 162/181.8; 162/183; 127/33; 127/70; 536/45; 536/102; 536/106

(58) Field of Classification Search
USPC ..... 162/158, 175, 181.6, 181.8, 168.1, 162/183–184; 127/32–33, 38, 65, 69–71; 536/45, 102–108, 111
See application file for complete search history.

(56) References Cited

U.S. PATENT DOCUMENTS 3,770,472 A 11/1973 Jarowenko
3,778,431 A 12/1973 Kightlinger et al.
3,884,909 A 5/1975 Kightlinger et al.
3,951,947 A 4/1976 Schanefelt et al.
3,969,340 A 7/1976 Tessler et al.
4,029,885 A 6/1977 Buikema
4,146,515 A 3/1979 Buikema et al.
4,373,099 A 2/1983 Hubbard et al.
4,385,961 A 5/1983 Svending et al.
4,388,150 A 6/1983 Sunden et al.
4,438,148 A * 3/1984 O'Rourke et al. ..... 426/579
4,566,910 A 1/1986 Hubbard et al.
4,643,801 A 2/1987 Johnson
4,902,382 A 2/1990 Sakabe et al.
4,911,790 A 3/1990 Lindstrom et al.
4,946,557 A 8/1990 Svending
5,122,231 A 6/1992 Anderson
5,187,272 A * 2/1993 Katcher et al. ..... 536/102
5,368,690 A 11/1994 Solarek et al.
5,523,339 A 6/1996 Solarek et al.
5,723,023 A 3/1998 Tsai et al.
5,989,350 A 11/1999 Fischer et al.
6,187,144 B1 2/2001 Ketola et al.
6,365,002 B1 * 4/2002 Bindzus et al. ..... 162/175
6,436,237 B1 8/2002 Berckmans et al.
6,451,170 B1 9/2002 Anderson et al.
6,716,313 B2 4/2004 Vihervaara et al.
6,843,888 B2 1/2005 Merrette et al.
2002/0088585 A1 * 7/2002 Anderson et al. ..... 162/175
2002/0170693 A1 11/2002 Merrette et al.
2003/0188738 A1 * 10/2003 Laleg ..... 127/32
2004/0011487 A1 1/2004 Helbling et al.

* cited by examiner

*Primary Examiner* — Jose A Fortuna

(57) ABSTRACT

Starch compositions, including cationic crosslinked starches, and methods of using those starches in papermaking are disclosed. In particular, a cationized crosslinked starch and use of the starch in the wet end system of a paper machine is disclosed. The starch compositions of the disclosure are particularly adapted for customization for specific wet end systems, and allow for modification to correspond to variations in the wet end of the papermaking machine.

61 Claims, 6 Drawing Sheets

STARCH COMPOSITIONS AND METHODS FOR USE IN PAPERMAKING

Matter enclosed in heavy brackets [ ] appears in the original patent but forms no part of this reissue specification; matter printed in italics indicates the additions made by reissue.

REFERENCE TO CO-PENDING APPLICATION

This application is a Continuation-in-Part of application Ser. No. 09/635,962, filed Aug. 10, 2000 now U.S. Pat. No. 6,451,170.

FIELD OF THE INVENTION

The present disclosure is directed to improved starch compositions, and methods of making and using the improved starch compositions. In particular, the disclosure is directed to starch compositions for use in papermaking processes, and to methods of preparing, manipulating and using the starch compositions during manufacture of paper products.

BACKGROUND

Numerous paper products are manufactured from fibers. These products are often manufactured from an aqueous slurry containing modified cellulose fibers derived from various plant sources. The slurry is formed in the wet end of a papermaking machine, where paper fiber is formed into a dilute water slurry and combined with a variety of materials before being distributed onto a paper machine wire. The water is subsequently removed from the slurry in a controlled manner to form a web, which is pressed and dried to create a finished paper product.

Additives can be incorporated into the slurry to enhance the papermaking process and to improve the finished papers' aesthetic and functional properties. These additives can include starch compositions incorporated during the wet end of the papermaking process to improve drainage and retention, to add strength, and to improve formation properties of the paper. Starch compositions can increase ink penetration times, reduce lateral spread of printing inks, and improve imaging and contrast. Starch compositions can also increase the surface integrity of papers, thereby decreasing picking in uses such as printing and photocopying.

Other ingredients that can be incorporated into paper are microparticles, including specialty clays, silica, and other functional fine particles. These microparticles are often added during the wet end of the papermaking machine. Depending upon the type of paper being made, as well as the characteristics of the slurry, various different microparticles can be added. One of the challenges of using microparticles during papermaking is that the microparticles are not all retained on the web as the paper is formed. The microparticles that are not retained often end up being discharged, which can be expensive because the particles are not used. Therefore, it is desirable to enhance particle retention.

Drainage, or de-watering ability, is another important consideration in the manufacture of paper because it is related to how fast a paper machine can remove water from the web. Typically, improved dewatering corresponds to higher speeds on paper machines and to higher production rates of paper. Papermakers often seek to retain all fiber and particulates on the wire at the greatest speed economically possible, without sacrificing product quality. However, papermakers often experience drainage limitations while trying to maintain product quality, and therefore it is desirable to have high drainage values such that the paper can be made at high speeds and high quality.

Although papermakers and suppliers of paper ingredients realize that high retention and drainage are desirable, a considerable challenge in making consistent, high-quality paper has been that papermaking systems are not all alike and can show significant variation. This variation can be the result of changes in the ingredients in the paper furnish as well as variability in the papermaking equipment. These variations can make it difficult to produce quality paper at high speeds due to changes in particle retention and drainage.

Presently, most ingredients added to the papermaking slurry are optimized for use under specific conditions. This is true, for example, of starch compositions added to the wet end of the papermaking process. Unfortunately, conditions at most papermaking facilities vary over time as the ingredients and systems change. Therefore, a need exists for improvements that allow for satisfactory drainage and particle retention over a range of papermaking conditions.

SUMMARY OF THE DISCLOSURE

The present disclosure relates to starches, for example cationic crosslinked starches, and to the use of those starches in papermaking. More particularly, the present disclosure is directed to starch and its use in wet end processing of a paper machine. The practices of the disclosure are particularly adapted for customization of the starch properties for specific wet end systems, and allow for modification of the starch properties to correspond to variations in the wet end of the papermaking machine.

The starch can also be modified during production by adjusting the starch functionality in the papermaking process. By selectively changing the crosslinking level of the starch, the drainage and retention properties of the paper furnish containing the starch are altered, which permits the starch properties to be tailored to provide improved performance depending upon the characteristics of the paper furnish in which it will be used.

The starch properties can further be adjusted immediately prior to use in the wet end of the papermaking machine in order to tailor the starch to the specific conditions existing in the papermaking machine. In this manner, the starch can be tailored to improve drainage and retention. This customization occurs, for example, by modification of the temperature at which the starch composition is cooked prior to addition to the wet end, by changing the period of time for cooking the starch, by changing the pressure at which the starch is cooked, and/or by changing the solids content of the starch prior to cooking. By adjusting these parameters, either individually or in concert, the properties of the starch are altered and can be conformed to specific conditions of various papermaking processes. For example, by cooking at higher or lower temperatures the starch properties are altered, and these altered properties can be used to improve wet end performance.

One implementation of the disclosure is a process for improving a papermaking method. The process comprises providing a papermaking furnish containing cellulosic fibers in an aqueous slurry to which is added a starch composition. The starch composition is typically a crosslinked cationic starch. The starch is cooked prior to addition to the papermaking furnish at a cooking temperature typically below 330° F., and more typically from 180 to 250° F., and even more typically less than 220 of or 230° F. Such cooking temperatures are typically average cooking temperatures, which corresponds to the average temperature measured from two or more temperatures over time.

Microparticles, including nanoparticles, are also incorporated into the papermaking furnish to enhance machine performance, such as drainage and retention, and these microparticles typically have an average diameter of less than 1.0 micron, and more typically less than 0.1 microns. Suitable microparticles include, for example, various silica and clays.

The cationic crosslinked starch of the disclosure is typically mixed as a wet end additive into a paper furnish having a pH of from about 4.0 to about 9.0 in the wet end. The general manufacturing process for paper, including the term "wet end", is described generally in Pulp & Paper Manufacture, Vol. III, Papermaking and Paperboard Making R. G. McDonald, editor, J. N. Franklin, tech. editor McGraw Hill Book Co., 1970.

In specific implementations, the starch and methods are used to improve dewatering of papermaking furnishes. As the furnish is dewatered during the papermaking process, the dewatering rate is evaluated. If this dewatering rate is unsatisfactory, then the cooking temperature of the starch is modified in order to alter the dewatering properties. The modification of the cooking temperature should be sufficient to produce a modification in the dewatering or first pass retention of the papermaking furnish. Typically, the amount of modification in the temperature is greater than 1° F., and more typically at least 5° F. In specific implementations, the amount is from 5 to 10° F. In certain implementations the modification is at least about 10° F. The temperature is increased in certain implementations, and decreased in other implementations, depending upon the dewatering or drainage performance prior to modification of the cooking temperature.

It is sometimes necessary to determine the proper change in temperature through iterative changes in temperature followed by evaluation of the paper properties. Such iterative changes allow for step-wise evaluation and adjustment of the furnish properties. For example, when dewatering properties are unsatisfactory or show deterioration, the temperature can be initially lowered by a specific temperature (for example, 5° F.). If this lowering shows improvement in dewatering, then the temperature can be maintained at this new temperature. Alternatively, the temperature can be further lowered to seek even At greater improvements in dewatering levels. If this lower temperature improves the dewatering properties, then the temperature can be kept at this level (or lowered further to seek even greater improvements). However, if this lower temperature does not improve the dewatering properties, then the temperature can be raised back to the previous level. Alternatively, the temperature can be raised part way back to the previous level.

If the initial lowering does not result in an improvement in the dewatering properties, then the temperature should typically be raised above the initial temperature to determine if the dewatering properties improve. If the dewatering properties do not improve, then the temperature should be returned to the initial temperature or returned to a temperature intermediate the initial temperature and the raised temperature. If the dewatering properties do improve, then the temperature can be maintained at the heightened temperature or raised again to seek an even greater temperature. In this manner and similar manners the temperature at which the starch is cooked is used to alter the properties of the starch produced, thereby tailoring those properties to the wet-end properties of a paper machine. In addition to adjusting the retention and drainage properties by adjusting the cooking temperature of the starch, these properties can be adjusted by modification of the pressure at which the starch is cooked and by changing the solids content of the starch prior to being cooked. For example, the starch is typically cooked in a jet cooker at a pressure of less than 100 pounds per square inch; and the starch is typically added to the jet cooker at a solids content of less than 10 percent. By altering the pressure or the solids content, the starch composition can be tailored to the specific properties of the wet end furnish to which they are added.

Not only can the temperature, pressure, and solids levels be independently modified to improve the wet end performance, but they can be modified together to change the starch properties. For example, all three parameters can be changed, the temperature and pressure can be changed, the temperature and solids content can be changed, or the pressure and solids content can be changed. Also, besides drainage and retention, other improvements can be made in the wet end properties, such as improvements in line speed that are often observed along with improvements in drainage and retention.

A further implementation includes a process for adjusting a papermaking method. The process entails adjusting the temperature at which the starch composition is cooked in order to obtain improved drainage or retention properties of the papermaking furnish. The process includes providing a papermaking furnish containing cellulosic fibers and microparticles in an aqueous slurry, and providing a starch composition formulated for addition to the papermaking furnish. A portion of the starch composition is cooked at an initial temperature and then added to the papermaking furnish. The furnish is subsequently dewatered to form a cellulosic fiber web. An assessment regarding the rate of dewatering or particle retention of the aqueous slurry is made, and if the dewatering is at an unsatisfactory rate then the temperature at which the starch composition is cooked is changed to a different temperature in order to modify the rate of dewatering of the aqueous slurry.

The above summary of the present disclosure is not intended to describe each embodiment of the present disclosure. This is the purpose of the figures and the detailed description which follow.

BRIEF DESCRIPTION OF THE DRAWINGS

Other aspects and advantages will become apparent upon reading the following detailed description and upon reference to the drawings in which.

Figure 1:
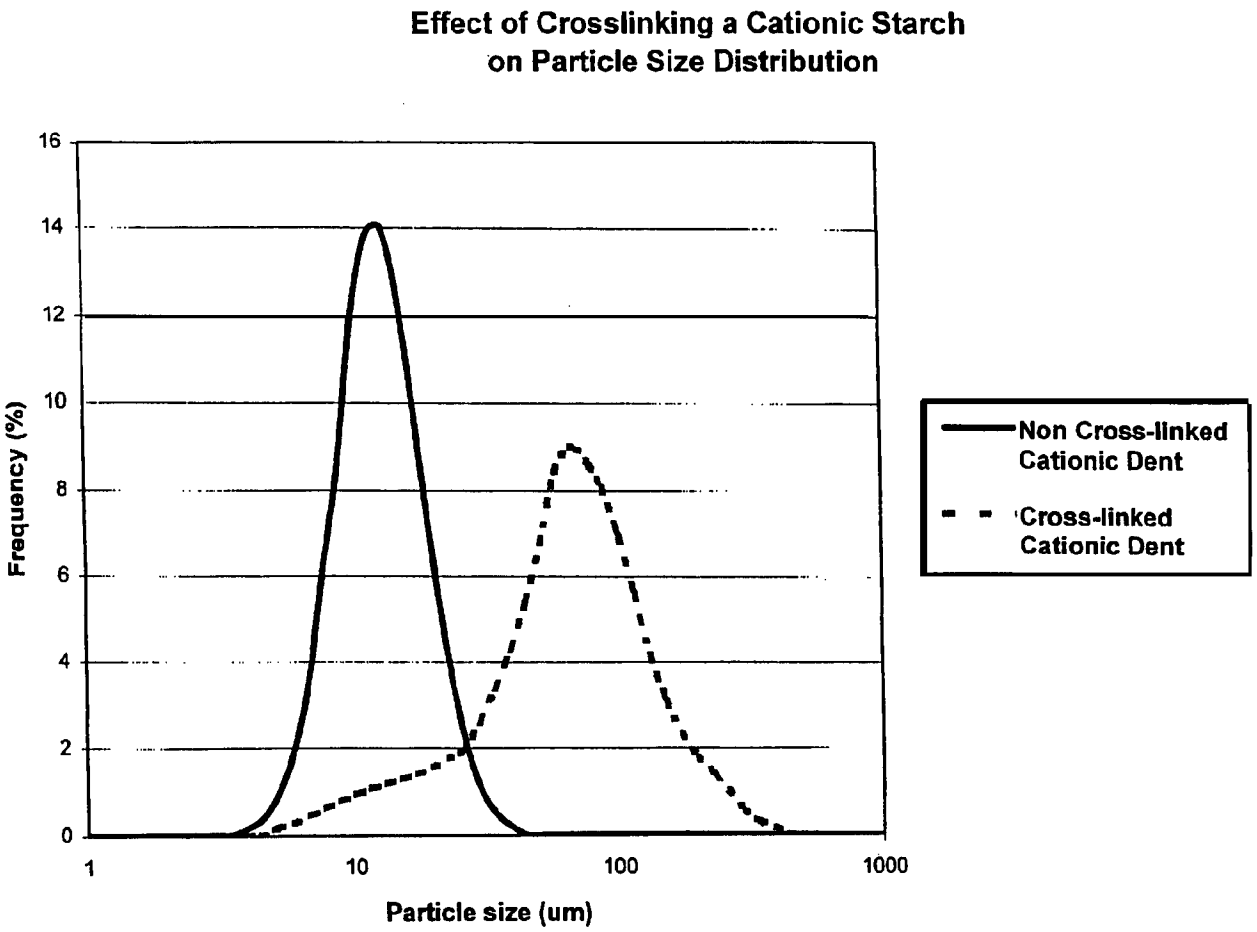
FIG. 1 is a chart depicting particle size distribution of example wet end starches, one of which has been crosslinked and one of which has not.

While the disclosure is susceptible to various modifications and alternative forms, specifics are shown by way of example and are described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

The present disclosure relates to starches, including cationic crosslinked starches, and to the use of those starches in papermaking. More particularly, the present disclosure is directed to cationized crosslinked starch and to use of the starch in the wet end system of a paper machine. The starch is adapted for customization to various wet end conditions, and allows for modification to correspond to variations in the wet end of the papermaking machine.

According to an aspect of the disclosure, a cationic starch which has been crosslinked after cationization is added to paper pulp or furnish during paper manufacture. The starch is cooked prior to addition at the wet end of the papermaking machine and the cooking parameters are adjusted in order to improve the properties of the wet end furnish, such as particle retention and drainage of the furnish. In this manner the properties of the starch are customized so as to conform to the specific conditions of the wet end of the paper machine.

The following detailed description includes specific starch compositions, methods of adjusting the properties of the starch compositions to conform to the conditions of the papermaking process, and improvements in the papermaking performance, including improved drainage and improved first pass retention and microparticle retention.

A. Modifiable Starch Compositions

In a first aspect, the present disclosure is directed to starch compositions suitable for use in the wet end stage of paper manufacturing. The starch compositions of the disclosure possess properties permitting them to be modified during cooking to improve performance during the papermaking process.

The starch can be selected from a variety of starches, including corn (such as waxy corn or dent corn), potato, sorghum, tapioca, wheat, rice, etc. The starch is preferably a corn starch, and typically a dent corn starch, and more typically a cationized dent corn starch. The starch should have hydroxyl groups or another functional groups to permit crosslinking. Additional properties relating to crosslinking levels, viscosity, substitution levels, and particle size are described below.

The starch is typically crosslinked with a crosslinker which is reactive with the hydroxyl functionality of the starch. The crosslinked starch permits a greater range in particle sizes compared to non-crosslinked starch. This range of particle sizes allows greater opportunity to improve wet-end performance. Without being limited to a theory of use, it is believed that improved performance is obtained when starch particle size closely correlates to that of other particles in the furnish. Although the starch particles can be smaller than the paper fibers and larger then microparticle additives, a relationship is believed to exist between the sizes of the various particles (fiber, starch, and microparticle).

In reference now to FIG. 1, a graph is shown depicting the particle size profiles of non-crosslinked cationic dent corn starch compared to crosslinked cationic dent corn starch. The non-crosslinked cationic dent starch has a narrow particle size distribution, while the crosslinked cationic starch has a wide particle size distribution. This greater distribution is believed to allow for greater probability of particle-particle collisions to occur among the particulates of the wet end furnish and the starch, thus resulting in increased retention of the microparticles.

The starch is formulated with a crosslinker, which can be a polyfunctional organic or inorganic compound wherein functional groups, such as epoxides or anhydrides, on the crosslinker are reactive with hydroxyl groups on the starch. The starch can be crosslinked with polyepoxide compounds such as a polyaminepolyepoxide resin, phosphorousoxychloride, 1,4 butanediol diglycidyl ether, dianhydrides, acetals, and polyfunctional silanes. The crosslinker can also be sodium trimetaphosphate. These and other suitable crosslinkers, and crosslinking methods, are described in U.S. Pat. Nos. 3,790,829; 3,391,018; 3,361,590, and 5,122,231, incorporated herein by reference.

Starch Viscosity

Typically, the level of crosslinking relates substantially to the starch viscosity. Thus, changes in viscosity can be implemented in part by altering the level of crosslinking. The amount of crosslinking is a function of the time and kind of crosslinker, as well as reaction conditions, all of which are chosen to provide a viscosity in a specified range.

The cationic crosslinked starch is typically crosslinked to a hot paste viscosity in the range of about 10 cps to about 3000 cps, typically from about 50 cps to 3000 cps, preferably from about 200 cps to about 3000 cps as measured on a Brookfield viscometer at 2.0 percent starch solids at 95° C., at 20 rpm, using a number 21 spindle in accordance with the method taught in U.S. Pat. No. 5,122,231, incorporated herein by reference.

Alternatively, the starch viscosity can be measured using breakdown viscosity in accordance with the methodology disclosed in U.S. Pat. No. 5,368,690, even though this methodology can be less precise for measurements of high viscosity starches. The percent breakdown viscosity is typically greater than 85 percent, and more typically greater than 90 percent. In a preferred implementation the breakdown viscosity is greater than 95 percent.

Starch Substitution Levels

Suitable starch compositions are desirably cationic starches that retain a positive charge when dissolved in water. The starch preferably contains a quaternary ammonium ion, which gives enhanced flexibility in pH. Frequently, such quaternary ammonium-containing starch is derivatized by etherification of hydroxyl groups with an appropriate etherifying agent. The etherifying agent has a cationic character such as (3-chloro-2-hydroxypropyl) trimethyl ammonium chloride, the methyl chloride quaternary salt of N-(2,3-epoxypropyl) dimethylamine or N-(2,3-epoxypropyl) dibutylamine or N-(2,3-epoxypropyl) methylaniline.

As used herein, the degree of substitution (DS) is defined as the average number of hydroxyl groups on each anhydroglucose unit which are derivatized with substituent groups. The DS serves as a measure of the charge on the cationized and crosslinked starch and is related to the average number of monovalent cations on the hydroxyl groups on each anhydroglucose unit. Degree of substitution is described generally in STARCH: Chemistry and Technology, second edition, R. L. Whister, J. N. Bemiller, and E. F. Paschall, editors, Academic Press, Inc., 1984. The starch is typically cationized to a degree of substitution (DS) of greater than 0.005, but not greater than 0.100, more typically to a DS of about 0.030 to about 0.070. The starch preferably has a DS of from 0.030 and 0.040.

The starch can be cationized by any known method, such as by reacting it in an alkaline medium with tertiary or quaternary amines followed by neutralization, and washing and drying as desired. Known methods for cationizing starch are described in U.S. Pat. No. 4,146,515 to Buikema et al. and U.S. Pat. No. 4,840,705 to Ikeda et al, incorporated herein by reference. In one aspect of the disclosure, corn starch is cationized by reaction of the starch with (3-chloro-2-hydroxypropyl) trimethyl ammonium chloride in an alkaline medium provided by sodium hydroxide to form the cationic (2-hydroxypropyl) trimethyl ammonium chloride starch ether with a molar degree of substitution (DS) of the ether on the starch in the range of from 0.030 to 0.040.

Starch Particle Size

The starch compositions of the present disclosure are advantageous in that they permit modification of the particle size based upon the nature of the starch composition and the manner in which it is cooked, including the temperature, pressure, and solids level. Thus, the particle sizes can be changed in order to provide the most advantageous properties in the wet end finish. The starch particle size can be determined using a particle size distribution analysis, such as using Mie scattering theory incorporated into size distribution analyzers made by Horiba, Inc., including LA910 size distribution analyzer. Mie scattering theory does not provide a direct measurement of diameter, but indicates at least the relative particle size.

Figure 2:
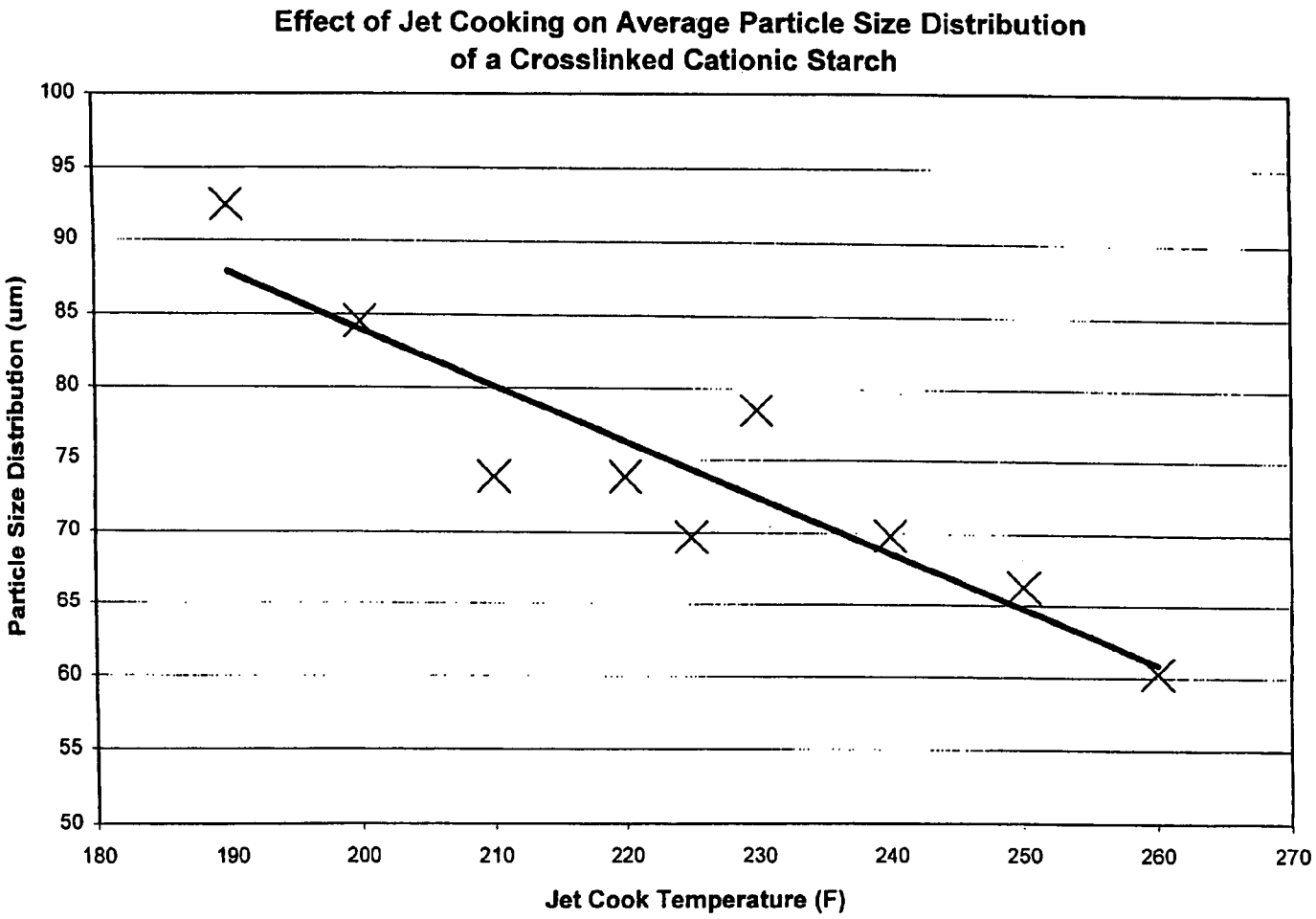
FIG. 2 is a chart depicting the average particle size of a crosslinked cationic starch cooked at various jet cooking temperatures.

In reference now to FIG. 2, an example particle size distribution of a starch composition made in accordance with the disclosure is shown. Depending upon the cooking temperature, the particle size distribution changes significantly for the crosslinked starch. In the example depicted, the average particle size changes as cooking temperature changes from about 190 to 265° F. The maximum size is obtained at low cooking temperatures. By changing the cooking temperature, the average particle size also changes, allowing for close tailoring of the particle size to the specific wet end furnish to which the starch is added.

B. Microparticle Ingredients

Microparticles are also incorporated into the papermaking furnish. The microparticles typically aid in drainage, and can function as a flocculent. Suitable microparticles include silica and clays. The concentration of microparticles added to the wet end furnish in accordance with the disclosure will vary depending upon the desired properties of the finished paper product, along with retention levels obtained. Microparticles are typically added at a concentration of less than 5.0 pounds per ton of fiber, and more typically less than 2.0 pounds per ton of fiber.

The microparticles typically have an average diameter of less than 1.0 micron, and more typically less than 0.5 microns. Drainage aids such as colloidal silica often have an average diameter of about 0.1 μm, fillers are typically 1 to 50 μm, latex conglomerates are from 10 to 100 μm, and fiber is often 200 μm or greater.

Figure 3:
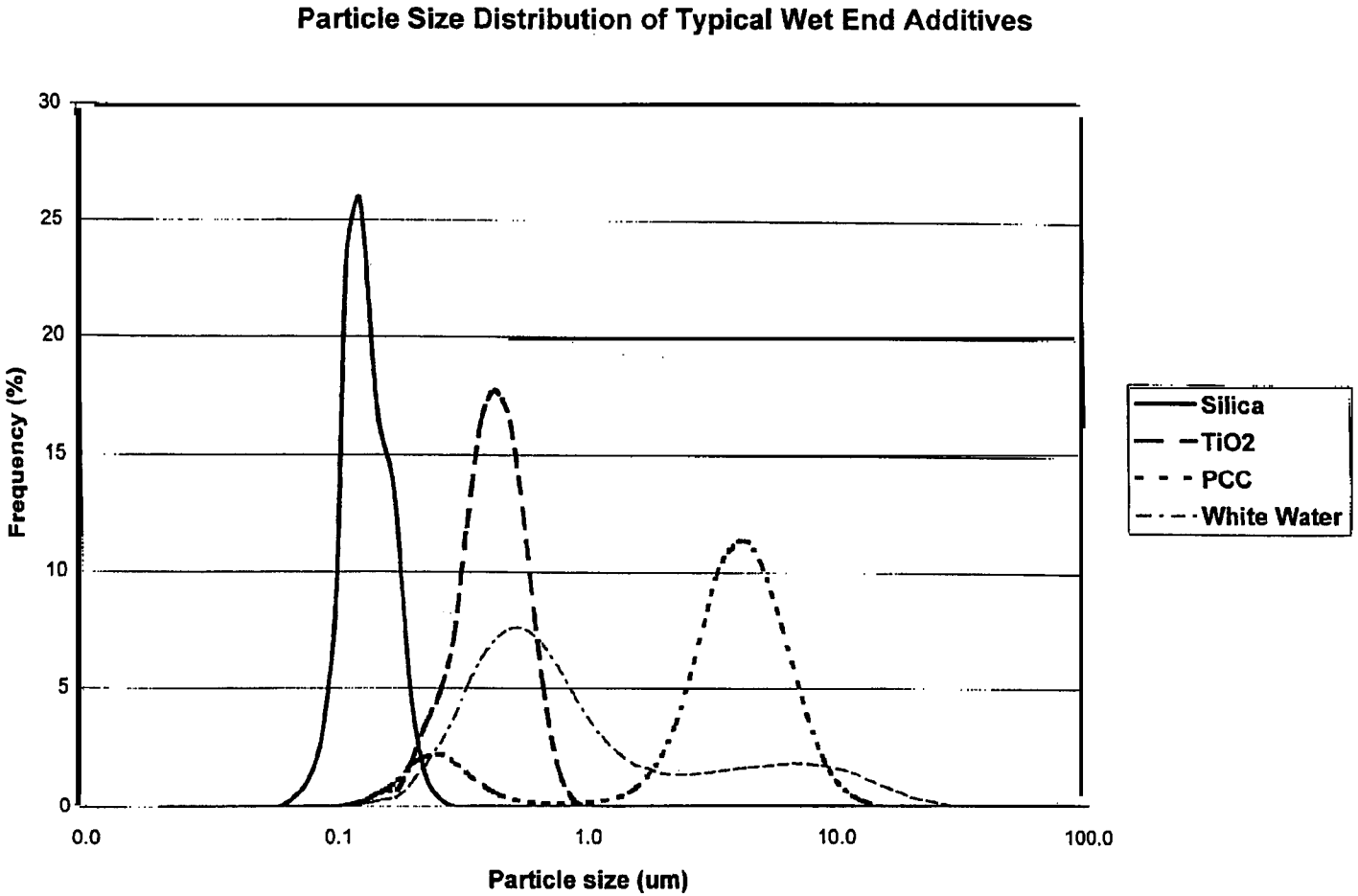
FIG. 3 is a chart depicting the particle size distribution of example wet end additives.

In reference now to FIG. 3, a particle size distribution for typical wet end ingredients is shown, including silica, titanium dioxide, precipitated calcium carbonate (PCC), and white water. As indicated, the particle sizes vary depending upon the type of particle. Silica has a particle size of approximately 0.10 μm, titanium dioxide has an average particle size of approximately 0.8 μm and a range of 0.5 to 1.0 μm. PCC ranges from approximately 1.0 μm to over 10 μm. White water ranges broadly from less than 1.0 μm to over 10 μm. Depending upon the amount of microparticles that are added, the starch composition should be adjusted to optimize drainage and particle retention. It is often necessary to adjust the starch particle size to correspond to the various microparticle sizes. This is true when the microparticle sizes vary during paper manufacture, either as an intentional change in particle size or concentration, or as an inadvertent result of changes in the papermaking furnish.

C. Starch Preparation Conditions

The present disclosure allows papermakers to cook the starch compositions in a manner such that the starch properties, including particle size and particle size distribution, are optimized to coincide with the papermaker's general wet end properties, including particle size and particle size distribution of the particulates in the wet end. Without being limited by theory, it is believed that this variation in particle size of the starch compositions is correlated to changes in drainage and retention. When the particle sizes of the starch properly correlate to the particle sizes of the inorganic and organic (e.g. fiber, latex) particles added to the starch, the furnish achieves enhanced drainage and retention properties, among other properties. The broad starch particle size range can be manipulated with the papermaker's starch cooker. The ability to change the particle size and particle size population to coincide with the papermakers' wet end allows superior retention and drainage performance.

D. Methods of Adjusting the Properties of the Starch Composition

Modification of Cooking Temperature

In a first implementation, the starch properties are modified by altering the starch cooking temperature, in particular the temperature at which the starch is jet cooked. In specific implementations, the improved starch and cooking temperature adjustment methods are used to improve dewatering of papermaking furnishes and/or the retention of microparticles. As the furnish is dewatered during the papermaking process, the dewatering rate is evaluated. If this dewatering rate is unsatisfactory, then the cooking temperature of the starch is modified in order to alter the dewatering properties.

The modification of the cooking temperature should be sufficient to produce a modification in the dewatering or first pass retention of the papermaking furnish. Thus, temperature changes should be of great enough magnitude to impact the papermaking furnish properties. Typically, the amount of modification in the temperature is greater than 1° F., and more typically greater than 5° F. In specific implementations, the amount is from 5 to 10° F. In certain implementations the modification is at least about 10° F. The temperature is increased in certain implementations, and decreased in other implementations, depending upon the dewatering or drainage performance prior to modification of the cooking temperature.

In a particular implementation, the papermaking process includes the steps of cooking a starch component, dewatering a paper furnish, and then adjusting the dewatering rate by changing the cooking temperature of the starch component. The first step, cooking the starch component, includes cooking at a first average cooking temperature below 330° F. for a first period of time a cationized crosslinked starch having a hot paste viscosity in the range of from about 50 cps to about 3000 cps as measured in a Brookfield viscometer in at 2.0 percent starch solids at 95° C., at 20 rpm, using a number 21 spindle. The furnish includes cellulosic fibers in an aqueous slurry, inorganic particles comprising at least 50 percent by weight particles having an average particle size of no greater than 1 micron, and the cooked starch component. The rate of dewatering is adjusted by cooking the starch composition at a second temperature at least 10° F. different than the first average cooking temperature. In specific implementations, the second average cooking temperature is from 200 to 250° F., and in other implementations the second average cooking temperature is less than 230° F. The microparticles can include silica, clay, and combinations thereof.

Additional steps can include determination of particle retention and modification of temperature to adjust retention.

The starch composition can be cooked in a jet cooker, and at a pressure of less than 150 pounds per square inch. In specific implementations the starch is added to the jet cooker at a solids content of from 1 to 10 percent.

Due to the complexity of the furnish properties, it is sometimes necessary to determine the proper change in temperature through iterative changes in temperature followed by evaluation of the paper properties. These changes involve making adjustments from the initial cooking temperature to determine if the changes will improve retention, drainage, or other paper products. Such changes seek to optimize starch properties by adjusting the cooking temperature until the properties approach preferred ranges.

For example, when dewatering properties are unsatisfactory or show deterioration, the temperature can be initially lowered by a specific temperature (for example, 5° F.). If this lowering shows improvement in dewatering, then the temperature can be maintained at this new temperature. Alternatively, the temperature can be further lowered to seek even greater improvements in dewatering levels. If this lower temperature improves the dewatering properties, then the temperature can be kept at this level (or lowered further to seek even greater improvements). However, if this lower temperature does not improve the dewatering properties, then the temperature can be raised back to the previous temperature.

Alternatively, the temperature can be raised to part way back to the previous temperature. If the initial lowering does not result in an improvement in the dewatering properties, then the temperature should typically be raised above the initial temperature to determine if the dewatering properties improve. If the dewatering properties do not improve, then the temperature should be returned to the initial temperature or returned to a temperature intermediate the initial temperature and the raised temperature. If the dewatering properties do improve, then the temperature can be maintained at the heightened temperature or raised again. In this manner the temperature at which the starch is cooked is used to alter the properties of the starch produced, thereby tailoring those properties to the wet-end properties of a paper machine.

Modification of Cooking Pressures

In another implementation, the starch properties are modified by altering the starch cooking pressures, in particular the pressures at which the starch is jet cooked. As the furnish is dewatered during the papermaking process, the dewatering or retention rate is evaluated. If the dewatering or retention rates are unsatisfactory, then the cooking pressure of the starch is modified in order to alter the dewatering or retention properties. The modification of the cooking pressure should be sufficient to produce a modification in the dewatering or first pass retention of the papermaking furnish.

Typically, the amount of modification in the cooking pressure is greater than at least 1 psi, and more typically greater than 5 psi. In specific implementations, the amount is from 10 to 60 psi. In certain implementations the modification is at least about 20 psi. The pressure is increased in certain implementations, and decreased in other implementations, depending upon the dewatering or drainage performance prior to modification of the cooking pressure.

In a particular implementation, the papermaking process includes the steps of cooking a starch component, dewatering a paper furnish, and then adjusting the dewatering rate by changing the cooking pressure of the starch component. The first step, cooking the starch component, includes cooking a cationized crosslinked starch having a hot paste viscosity in the range of from about 10 to 3000 cps, more typically 50 to 3000 cps, and preferably 200 cps to about 3000 cps as measured in a Brookfield viscometer at about 2.0 percent starch solids and about 95° C. using a No. 21 spindle.

The furnish includes cellulosic fibers in an aqueous slurry, inorganic particles comprising at least 50 percent by weight particles having an average particle size of no greater than 1 micron, and the cooked starch component. The rate of dewatering is adjusted by cooking the starch composition at a second pressure at least 10 psi different than the first average cooking pressure.

Additional steps can include determination of particle retention and modification of pressure to adjust retention. In specific implementations the starch is added to the jet cooker at a solids content of from 1 to 10 percent.

Due to the complexity of the furnish properties, it is sometimes necessary to determine the proper change in pressure through iterative changes in pressure followed by evaluation of the paper properties. These changes involve making adjustments from the initial cooking pressure to determine if the changes will improve retention, drainage, or other paper products. Such changes seek to optimize starch properties by adjusting the cooking pressure until the properties approach preferred ranges.

For example, when dewatering or retention properties are unsatisfactory or show deterioration, the pressure can be initially lowered by a specific amount (for example, 10 psi). If this lowering shows improvement in dewatering or retention, then the pressure can be maintained at this new pressure. Alternatively, the pressure can be further lowered to seek even greater improvements in dewatering or retention levels. If this lower pressure improves the dewatering properties, then the pressure can be kept at this level (or lowered further to seek even greater improvements). However, if this lower pressure does not improve the dewatering properties, then the pressure can be raised back to the previous pressure. Alternatively, the pressure can be raised to part way back to the previous pressure.

If the initial lowering does not result in an improvement in the dewatering or retention properties, then the pressure should typically be raised above the initial psi to determine if the dewatering or retention properties improve. If the properties do not improve, then the pressure should be returned to the initial pressure or returned to a pressure intermediate the initial pressure and the raised pressure. If the properties do improve, then the pressure can be maintained at the heightened pressure or raised again to seek an even greater temperature. In this manner and similar manners the pressure at which the starch is cooked is used to alter the properties of the starch produced, thereby tailoring those properties to the wet-end properties of a paper machine.

Modification of Solids Levels

In a further implementation, the starch properties are modified by altering the starch solids levels at which the starch is cooked, and in particular the solids levels a which the starch is jet cooked. In specific implementations, the improved starch and methods are used to improve dewatering of papermaking furnishes and/or the retention of microparticles. As the furnish is dewatered during the papermaking process, the dewatering rate is evaluated. If this dewatering rate is unsatisfactory, then the solids levels of the starch is modified in order to alter the dewatering properties.

The modification of the solids levels should be sufficient to produce a modification in the dewatering or first pass retention of the papermaking furnish. Typically, the amount of modification in the solids levels is greater than 1 percent, and more typically greater than 2 percent. In specific implementations, the amount is from 3 to 10 percent. In certain implementations the modification is at least about 5 percent. The solids levels is increased in certain implementations, and decreased in other implementations, depending upon the dewatering or drainage performance prior to modification of the solids levels.

In a particular implementation, the papermaking process includes the steps of cooking a starch component, dewatering a paper furnish, and then adjusting the dewatering rate by changing the solids levels of the starch component prior to cooking in a jet cooker. The first step, cooking the starch component, includes cooking a cationized crosslinked starch in a jet cooker. The starch component prior to cooking has a hot paste viscosity in the range of from about 10 cps to 3000 cps, more typically 50 cps to 3000 cps, preferably 200 cps to about 3000 cps as measured in a Small Sample Brookfield Viscometer System (SSB) at 2.0 percent starch solids at 95° C., at 20 rpm, using a number 21 spindle as measured after 10 minutes. The furnish includes cellulosic fibers in an aqueous slurry, inorganic particles comprising at least 50 percent by weight particles having an average particle size of no greater than 1 micron, and the cooked starch component. The rate of dewatering is adjusted by cooking the starch composition at a second solids levels at least 1 percent different than the first average solids levels.

In specific implementations, the second average solids levels is from 5 to 6 percent, and in other implementations the second average solids levels is less than 5 percent. The microparticles can include silica, clay, and combinations thereof.

Additional steps can include determination of particle retention and modification of solids levels to adjust retention. The starch composition can be cooked in a jet cooker, and at a pressure of from 10 to 30 pounds per square inch. In specific implementations the starch is cooked at a temperature from 200 to 300° F.

Due to the complexity of the furnish properties, it is sometimes necessary to determine the proper change in solids levels through iterative changes in solids levels followed by evaluation of the paper properties. These changes involve making adjustments from the initial solids level to determine if the changes will improve retention, drainage, or other paper products. Such changes seek to optimize starch properties by adjusting the solids level until the properties approach preferred ranges.

For example, when dewatering properties are unsatisfactory or show deterioration, the solids levels can be initially lowered by a specific amount. If this lowering shows improvement in dewatering, then the solids levels can be maintained at this new solids levels. Alternatively, the solids levels can be further lowered to seek even greater improvements in dewatering levels. If this lower solids levels improves the dewatering properties, then the solids levels can be kept at this level (or lowered further to seek even greater improvements). However, if this lower solids levels does not improve the dewatering properties, then the solids levels can be raised back to the previous solids levels. Alternatively, the solids levels can be raised to part way back to the previous solids levels.

D. Improving Papermaking Performance

Under some conditions improved performance of the papermaking machine is obtained, such as by reducing the number of runability upsets, and will allow paper makers increased production throughput. This enhanced throughput can be the result of reducing the amount of paper that fails to conform to performance specifications, to improving drainage of the paper slurry, and increasing machine speed.

The starch is cooked and added to the wet end furnish, which contains cellulosic fibers. The furnish can include hardwood, softwood or a hardwood/softwood fiber blend. Addition of the cationic crosslinked starch can occur at various points in the papermaking process; including prior to conversion of the wet pulp into a dry web or sheet. Thus, for example, it can be added to the fiber while the latter is in the headbox, beater, hydropulper, or stock chest. The furnish can include additives, dyes, and/or fillers such as clays, $CaCO_3$, alum and the like. The disclosure advantageously permits the use of higher levels of starch and fillers in lieu of more expensive cellulosic fiber, the result being paper with enhanced strength made with less expensive raw materials in shorter process times with higher retention of fines and fillers.

E. Example

Paper stock was prepared to compare the effect of changes in retention, drainage, and viscosity using crosslinked and non-crosslinked cationic dent corn starches based upon changes in cooking properties. For each type of starch, thirty pounds of starch were added per dry ton of wood fiber. The starches were cooked at temperatures from 192 to 265° F., and solids levels were maintained from 1.28 to 1.39 percent. Average particle size of the starch particles was measured using a model LA910 Horiba Particle Size Distribution analyzer, and drainage was measured using a Dynamic Drainage Jar procedure. Preparation details are summarized in Table 1 and Table 2, below.

TABLE 1

Crosslinked Cationic Starch

| Sample | Cooking Temp (° F.) | Viscosity (CPS)* | Diluted Solids Percent | Average Particle Size (μm) | Drainage (ml/20 sec) | Retention |
|---|---|---|---|---|---|---|
| A | 196 | 250 | 1.28 | 118 | 41.6 | 60.77 |
| B | 217 | 205 | 1.39 | 114 | 54.7 | 62.25 |
| C | 233 | 150 | 1.37 | 102 | 58.6 | 63.44 |
| D | 245 | 115 | 1.34 | 76 | 42.1 | 64.46 |
| E | 265 | 95 | 1.28 | 61 | 38.5 | 61.91 |

*Brookfield viscosity of the cooked starch as measured at 150° F., at the solids percent shown in Table 1, using a #21 spindle.

TABLE 2

Non-Crosslinked Cationic Starch

| Sample | Cooking Temp (° F.) | Viscosity (CPS)* | Diluted Solids Percent | Average Particle Size (μm) | Drainage (ml/20 sec) | Retention |
|---|---|---|---|---|---|---|
| F | 192 | 40 | 1.66 | 34.1 | 33.8 | 61.71 |
| G | 218 | 30 | 1.43 | 8.4 | 31.4 | 60.78 |
| H | 240 | 20 | 1.23 | 10.1 | 33.2 | 64.12 |
| I | 265 | 20 | 1.38 | 5.3 | 32.9 | 62.84 |

*Brookfield viscosity of the cooked starch as measured at 150° F., at the solids percent shown in Table 1, using a #21 spindle.

Figure 4:
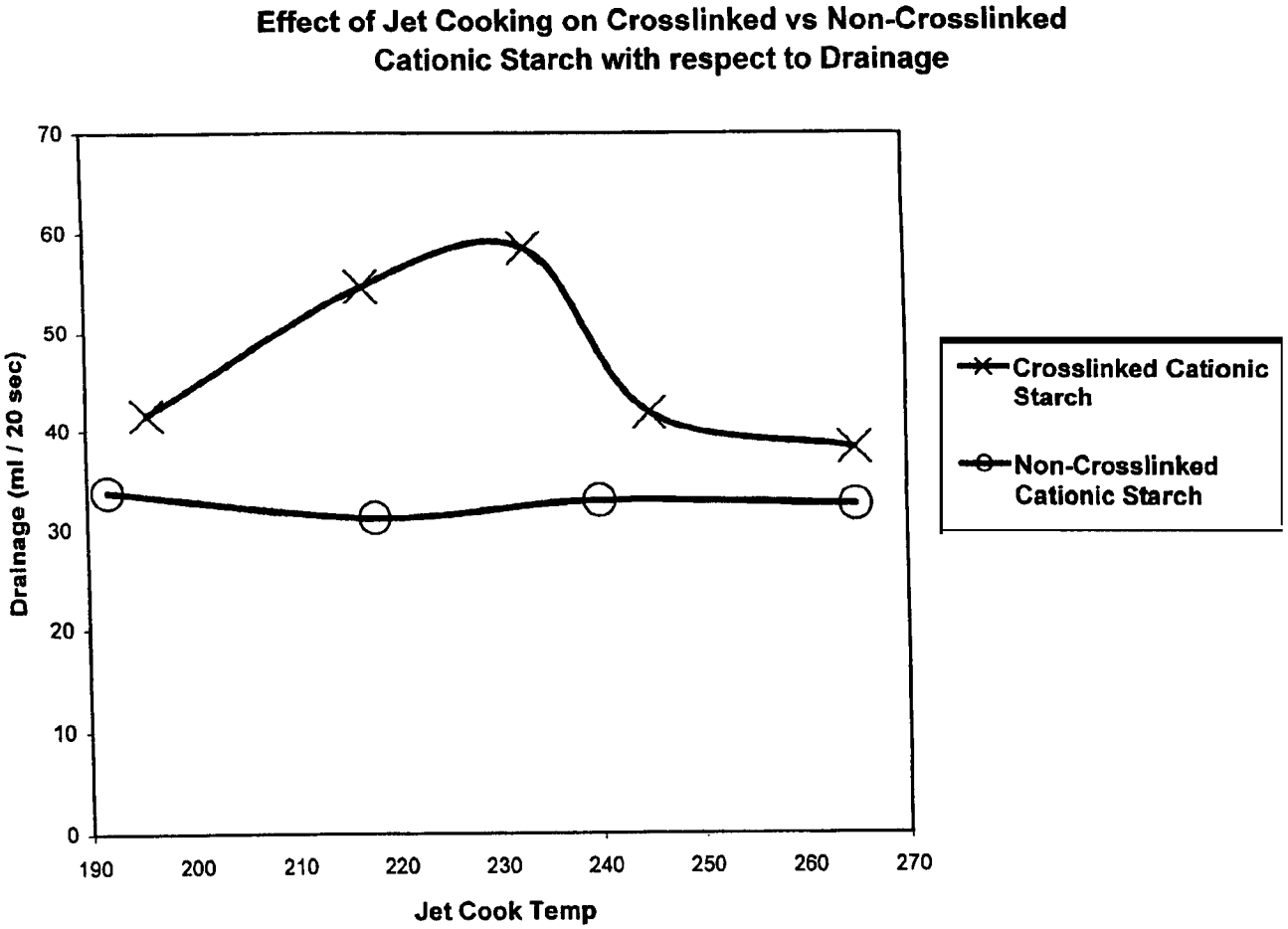
FIG. 4 is a chart depicting drainage of a crosslinked cationic starch and a non-crosslinked cationic starch that have been cooked at various temperatures.
Figure 5:
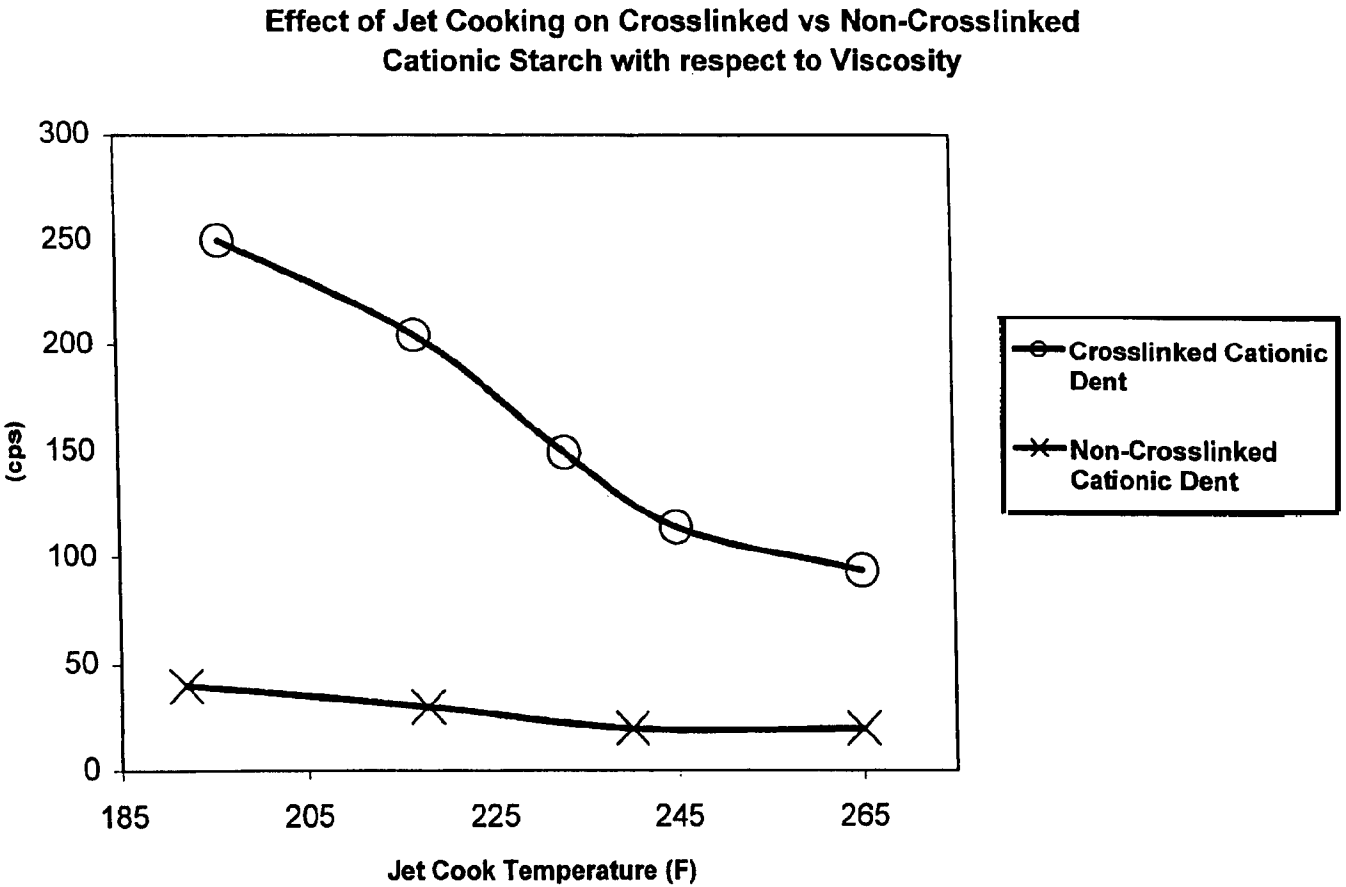
FIG. 5 is a chart depicting the viscosity of a crosslinked cationic starch and a non-crosslinked cationic starch that have been cooked at various temperatures.
Figure 6:
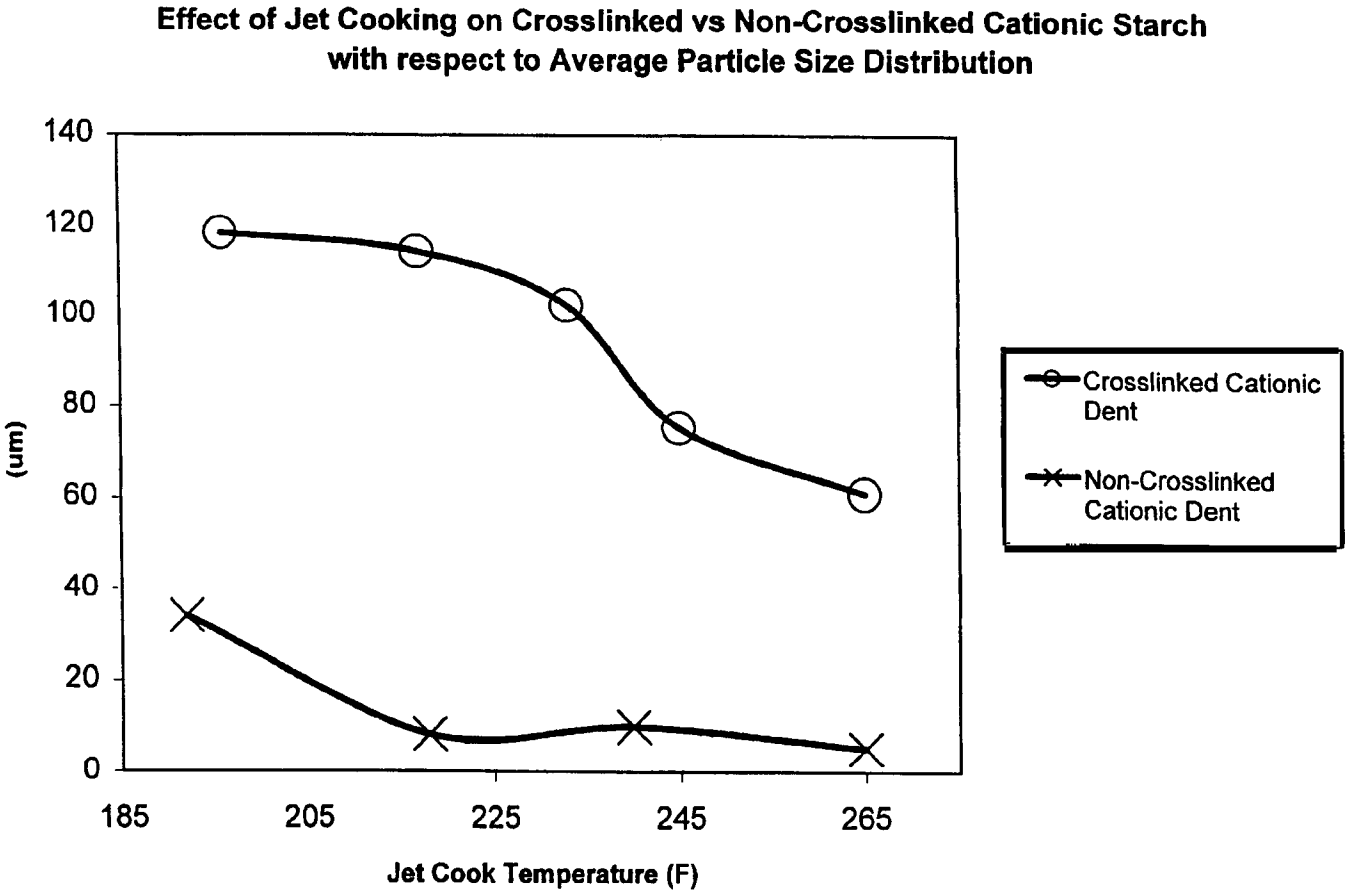
FIG. 6 is a chart depicting the average particle size of a crosslinked cationic starch and a non-crosslinked cationic starch that have been cooked at various temperatures.

Differences in papermaking properties of the two types of starch are depicted in FIGS. 4, 5, and 6, which show the drainage, viscosity, and particle size distribution for crosslinked cationic dent corn starch and non-crosslinked cationic dent corn starch at various jet cooking temperatures. As indicated in FIG. 4, the crosslinked cationic starch demonstrated dynamic drainage from approximately 200 to 260° F., with a peak at approximately 230° F. In contrast, the non-crosslinked cationic starch demonstrated relatively flat drainage (at a level below that of the crosslinked cationic starch) in this example.

Furthermore, as indicated in FIG. 5, crosslinked cationic starch shows a change in viscosity over a broad temperature range. In the example shown in FIG. 5 the crosslinked cationic starch had highest viscosity at low temperatures and lowest viscosity at elevated temperatures. The temperature range extended from about 200° F. up to 265° F. Over the same temperature range the non-crosslinked cationic starch did not show significant variations in viscosity.

FIG. 6 demonstrates changes in particle size distribution over an extended jet cooking range when using a crosslinked cationic starch compared to a non-crosslinked cationic starch. The particle size distribution was greatest at low jet cooking temperatures and decreased as the temperature increased. Generally, the non-crosslinked starch showed a substantially lower change in particle size distribution over the same temperature range.

These examples demonstrate the variation in starch properties over a range of cooking temperatures. In particular, they demonstrate changes in drainage and retention based upon changes in the cooking temperature.

We claim:

1. A papermaking process comprising the steps of:

a) providing a starch component comprising a cationized crosslinked starch having a hot paste viscosity in the measured range of from about 10 cps to about 3000 cps when measured in a Brookfield viscometer at about 95° C. using a No. *21* spindle at 20 rpm with a solids level of 2 percent;

b) cooking a first portion of the starch component to generate a cooked starch component, said cooking comprising cooking the starch component at first average cooking temperature below 330° F. for a first period of time;

c) dewatering a paper furnish, the paper furnish including:

(i) cellulosic fibers in an aqueous slurry, (ii) microparticles comprising at least 50 percent by weight particles having an average particle size of no greater than 1 micron, and (iii) the cooked starch component; and d) adjusting the dewatering rate by cooking a second portion of the starch component at a second average cooking temperature at least 10° F. different than the first average cooking temperature *and adding the second portion of the starch to the paper furnish*.

2. The process according to claim 1, wherein the second average cooking temperature is from 200 to 250° F.

3. The process according to claim 1, wherein the second average cooking temperature is less than 230° F.

4. The process according to claim 1, wherein the microparticles are selected from the group consisting of silica, clay, and combinations thereof.

5. The process according to claim 1, further comprising determination of particle retention and modification of temperature to adjust retention.

6. The process according to claim 1, wherein the starch composition is cooked in a jet cooker.

7. The process according to claim 1, wherein the cationized crosslinked starch comprises a dense corn starch.

8. The process according to claim 6, wherein the starch is cooked in a jet cooker at a pressure less than 100 pounds per square inch.

9. The process according to claim 1, wherein the starch is added to the jet cooker at a solids content of from 1 to 10 percent.

10. A paper product made in accordance with the process of claim 1.

11. A papermaking process comprising the steps of:

a) [proving] *providing* a starch component comprising a cationized crosslinked starch having a hot paste viscosity in the range of from about 10 cps to about 3000 cps as measured in a Brookfield viscometer at about 95° C. using a No. 21 spindle at 20 rpm with a solids level of 2 percent;

b) cooking a first portion of the starch component to generate a cooked starch component, said cooking comprising cooking the starch component at a first average cooking temperature below 330° F. for a first period of time;

c) dewatering a paper furnish, the paper furnish including:

(i) cellulosic fibers in an aqueous slurry, (ii) microparticles comprising at least 50 percent by weight particles having an average particle size of no greater than 1 micron, and (iii) the cooked starch component; and;

d) adjusting first pass retention during dewatering by cooking a second portion of the starch composition at a second average cooking temperature at least 10° F. different than the first average cooking temperature *and adding the second portion of the starch to the paper furnish*.

12. The process according to claim 11, wherein the first average cooking temperature is from 200 to 250° F.

13. The process according to claim 11, wherein the first average cooking temperature is less than 230° F.

14. The process according to claim 11, wherein the microparticles are selected from the group consisting of silica, clay, and combinations thereof.

15. The process according to claim 11, further comprising determination of particle retention and modification of temperature to adjust retention.

16. The process according to claim 11, wherein the starch composition is cooked in a jet cooker.

17. The process according to claim 16, wherein the starch is cooked in a jet cooker at a pressure from 5 to 30 pounds per square inch.

18. The process according to claim 16, wherein the starch is added to the jet cooker at a solids content from 1 to 3 percent.

19. A paper product made in accordance with the process of claim 11.

*20. A cooked cationic crosslinked starch paste having a viscosity of from about 95 to about 250 cps, as determined by using a Brookfield viscometer at a measurement temperature of about 150° F. using Spindle 21 at 20 rpm, at a solids level of about 1.2% to about 1.4%.*

*21. The cooked cationic crosslinked starch paste according to claim 20, wherein the average particle size ranges from about 0.1 to about 200 microns.*

*22. The cooked cationic crosslinked starch paste according to claim 21, wherein the average particle size ranges from about 0.5 to about 200 microns.*

*23. The cooked cationic crosslinked starch paste according to claim 21, wherein the average particle size ranges from about 0.5 to about 100 microns.*

*24. The cooked cationic crosslinked starch paste according to claim 21, wherein the average particle size ranges from about 10 to about 100 microns.*

*25. The cooked cationic crosslinked starch paste according to claim 21, wherein the average particle size ranges from about 1 to about 50 microns.*

*26. The cooked cationic crosslinked starch paste according to claim 21, wherein the average particle size ranges from about 61 to about 118 microns.*

*27. The cooked cationic crosslinked starch paste according to claim 20, wherein the cationic crosslinked starch is cooked at a temperature of less than 330° F.*

*28. The cooked cationic crosslinked starch paste according to claim 20, wherein the cationic crosslinked starch has a hot paste viscosity ranging from about 10 cps to about 3000 cps*

*as measured after 10 minutes on a Brookfield viscometer at 2.0% starch solids at 95° C. at 20 rpm using a number 21 spindle.*

*29. The cooked cationic crosslinked starch paste according to claim 28, wherein the hot paste viscosity ranges from about 50 cps to about 3000 cps.*

*30. The cooked cationic crosslinked starch paste according to claim 29, wherein the hot paste viscosity ranges from about 200 cps to about 3000 cps.*

*31. The cooked cationic crosslinked starch paste according to claim 20, wherein the cationic crosslinked starch has a percent breakdown viscosity greater than 85%.*

*32. The cooked cationic crosslinked starch paste according to claim 31, wherein the percent breakdown viscosity is greater than 90%.*

*33. The cooked cationic crosslinked starch paste according to claim 32, wherein the percent breakdown viscosity is greater than 95%.*

*34. A cooked cationic crosslinked starch paste having a viscosity of from about 95 to about 250 cps as determined by using a Brookfield viscometer at a measurement temperature of about 150° F. using Spindle 21 at 20 rpm at a solids level of about 1.2% to about 1.4%, prepared by cooking a cationic crosslinked starch having a hot paste viscosity in the range of from about 10 cps to about 3000 cps as measured after 10 minutes on a Brookfield viscometer at about 95° C. using a No. 21 spindle at 20 rpm at a solids level of 2 percent.*

*35. The cooked cationic crosslinked starch paste according to claim 34, wherein the hot paste viscosity ranges from about 50 cps to about 3000 cps.*

*36. The cooked cationic crosslinked starch paste according to claim 35, wherein the hot paste viscosity ranges from about 200 cps to about 3000 cps.*

*37. The cooked cationic crosslinked starch paste according to claim 34, wherein the cationic crosslinked starch is cooked at a temperature less than 330° F.*

*38. The cooked cationic crosslinked starch paste according to claim 34, wherein the cooked cationic crosslinked starch paste has an average particle size ranging from about 0.1 to about 200 microns.*

*39. The cooked cationic crosslinked starch paste according to claim 38, wherein the average particle size ranges from about 0.1 to about 100 microns.*

*40. The cooked cationic crosslinked starch paste according to claim 38, wherein the average particle size ranges from about 0.5 to about 200 microns.*

*41. The cooked cationic crosslinked starch paste according to claim 38, wherein the average particle size ranges from about 0.5 to about 100 microns.*

*42. The cooked cationic crosslinked starch paste according to claim 38, wherein the average particle size ranges from about 10 to about 100 microns.*

*43. The cooked cationic crosslinked starch paste according to claim 38, wherein the average particle size ranges from about 1 to about 50 microns.*

*44. The cooked cationic crosslinked starch paste according to claim 38, wherein the average particle size ranges from about 61 to about 118 microns.*

*45. The cooked cationic crosslinked starch paste according to claim 34, wherein the cationic crosslinked starch has a percent breakdown viscosity of greater than 85%.*

*46. The cooked cationic crosslinked starch paste according to claim 45, wherein the percent breakdown viscosity is greater than 90%.*

*47. The cooked cationic crosslinked starch paste according to claim 46, wherein the percent breakdown viscosity is greater than 95%.*

*48. A process for producing a cooked cationic crosslinked starch paste having a viscosity of from about 95 to about 250 cps, as determined by using a Brookfield viscometer at a measurement temperature of about 150° F. using Spindle 21 at 20 rpm, at a solids level of about 1.2% to about 1.4%, comprising cooking a cationic crosslinked starch having a hot paste viscosity in the range of from about 10 cps to about 3000 cps as measured after 10 minutes on a Brookfield viscometer at about 95° C. using a No. 21 spindle at 20 rpm at a solids level of 2 percent.*

*49. The process according to claim 48, wherein the hot paste viscosity ranges from about 50 cps to about 3000 cps.*

*50. The process according to claim 49, wherein the hot paste viscosity ranges from about 200 cps to about 3000 cps.*

*51. The process according to claim 48, wherein the cationic crosslinked starch is cooked at a temperature less than 330° F.*

*52. The process according to claim 48, wherein the cooked cationic crosslinked starch paste has an average particle size ranging from about 0.1 to about 200 microns.*

*53. The process according to claim 52, wherein the average particle size ranges from about 0.1 to about 100 microns.*

*54. The process according to claim 52, wherein the average particle size ranges from about 0.5 to about 200 microns.*

*55. The process according to claim 52, wherein the average particle size ranges from about 0.5 to about 100 microns.*

*56. The process according to claim 52, wherein the average particle size ranges from about 10 to about 100 microns.*

*57. The process according to claim 52, wherein the average particle size ranges from about 1 to about 50 microns.*

*58. The process according to claim 52, wherein the average particle size ranges from about 61 to about 118 microns.*

*59. The process according to claim 48, wherein the cationic crosslinked starch has a percent breakdown viscosity of greater than 85%.*

*60. The process according to claim 59, wherein the percent breakdown viscosity is greater than 90%.*

*61. The process according to claim 60, wherein the percent breakdown viscosity is greater than 95%.*

* * * * *